March 9, 1948.   P. G. HOLT   2,437,256
AUXILIARY CONTROL MECHANISM FOR AUTOMATIC PILOT
Filed Nov. 20, 1942   5 Sheets-Sheet 2
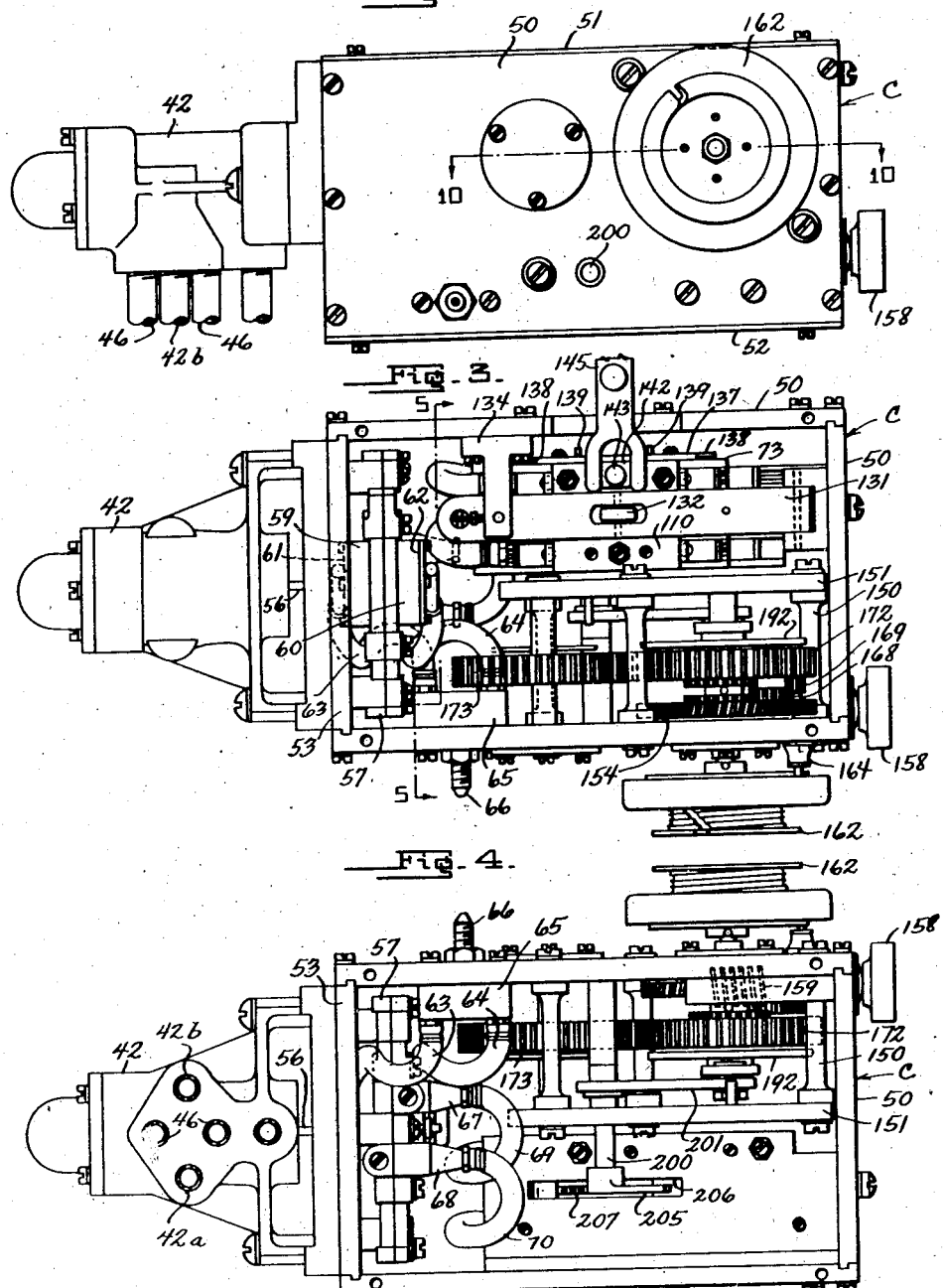
INVENTOR
Pliny G. Holt
BY
ATTORNEY March 9, 1948.  P. G. HOLT  2,437,256
AUXILIARY CONTROL MECHANISM FOR AUTOMATIC PILOT
Filed Nov. 20, 1942  5 Sheets-Sheet 3

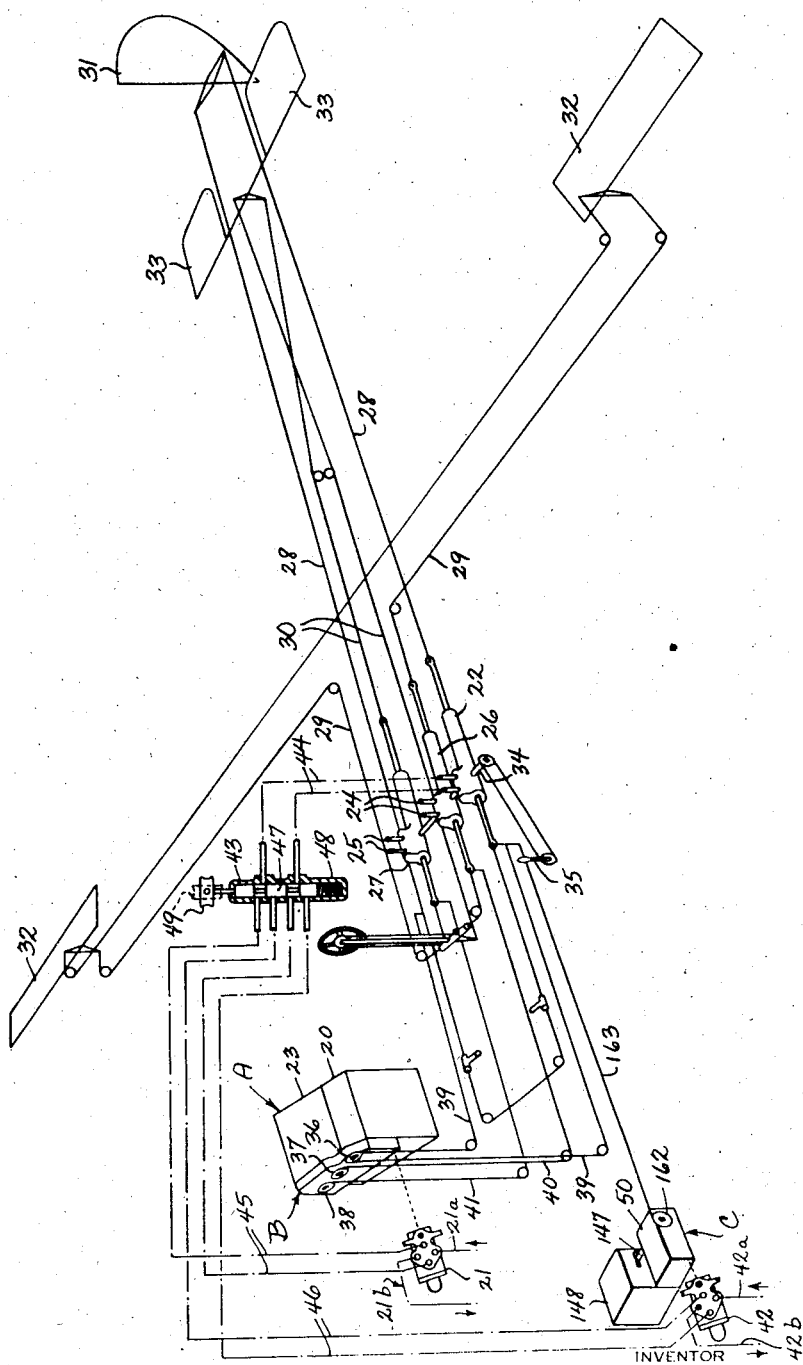

INVENTOR
Pliny G. Holt
BY
ATTORNEY

March 9, 1948.  P. G. HOLT  2,437,256
AUXILIARY CONTROL MECHANISM FOR AUTOMATIC PILOT
Filed Nov. 20, 1942  5 Sheets-Sheet 4
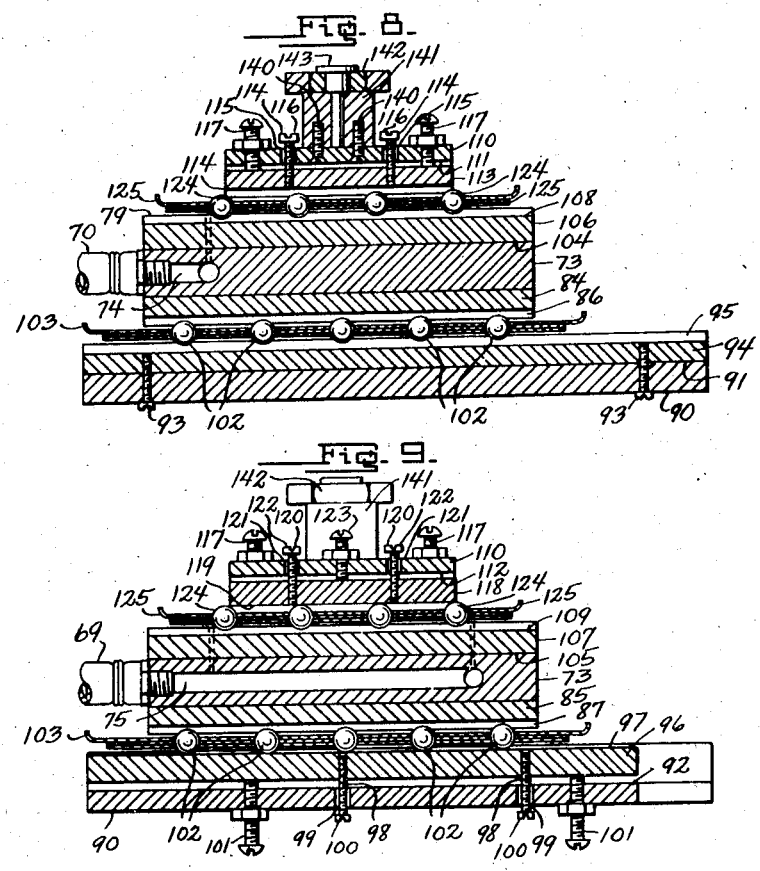
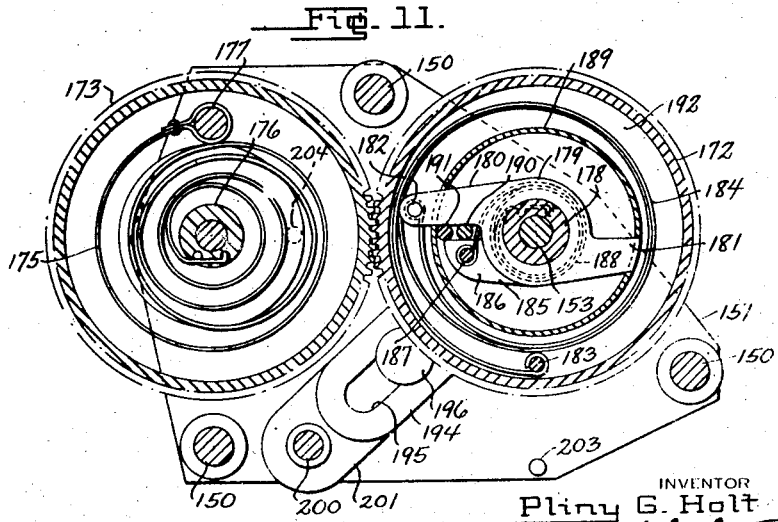
INVENTOR
Pliny G. Holt
BY
ATTORNEY March 9, 1948.  P. G. HOLT  2,437,256
AUXILIARY CONTROL MECHANISM FOR AUTOMATIC PILOT
Filed Nov. 20, 1942  5 Sheets-Sheet 5
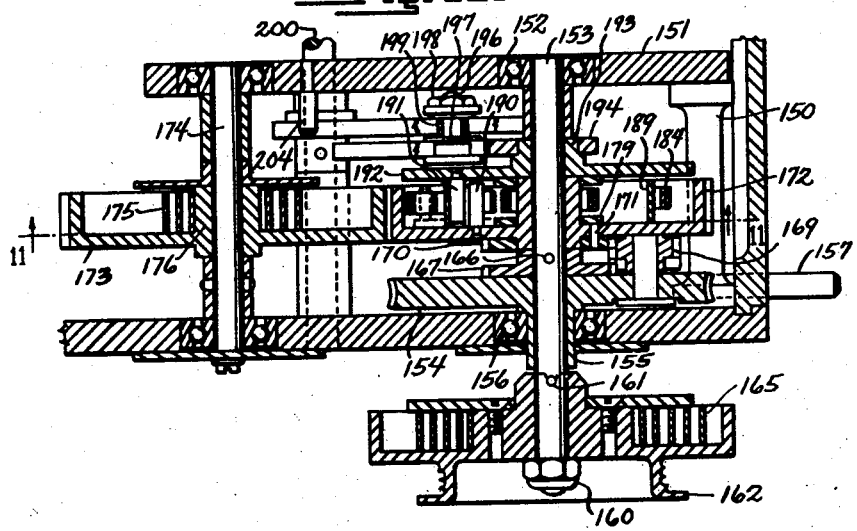
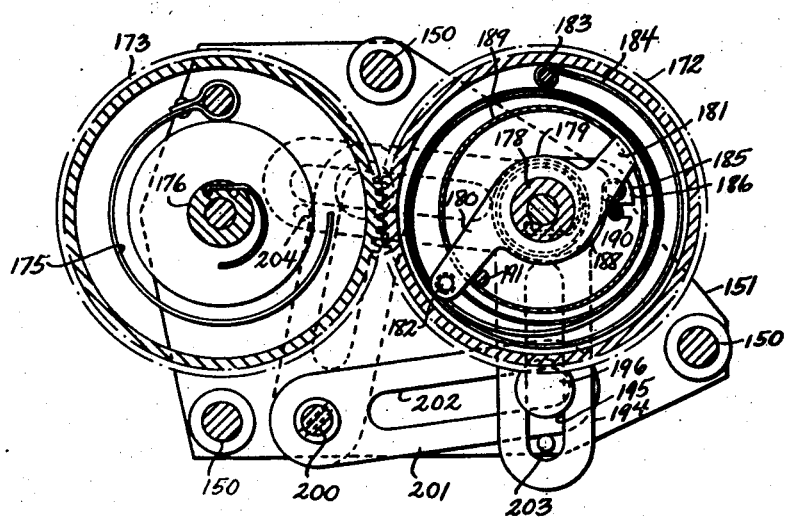
INVENTOR
Pliny G. Holt
BY
ATTORNEY Patented Mar. 9, 1948

2,437,256

UNITED STATES PATENT OFFICE 2,437,256

AUXILIARY CONTROL MECHANISM FOR AUTOMATIC PILOT

Pliny G. Holt, United States Navy

Application November 20, 1942, Serial No. 466,301

7 Claims. (Cl. 244—76)

(Granted under the act of March 3, 1883, as amended April 30, 1928; 370 O. G. 757)

1

The invention relates to improvements in automatic pilots for aircraft and, more particularly, to auxiliary control mechanism for use with automatic pilots of the general character shown and described in my copending U. S. patent application Serial No. 442,728, filed May 12, 1942, now Patent No. 2,401,354, granted June 4, 1946.

An important object of the present invention is to provide an automatic gyro-pilot having auxiliary rudder control mechanism.

Another object of the invention is to provide an automatic gyro-pilot for bomber aircraft having auxiliary rudder control mechanism associated with the bombsight.

Yet another object is the provision of an automatic gyro-pilot with rudder control mechanism including follow-up means transmitting motion in varying ratios depending on the rudder displacement.

A further object is to provide an automatic gyro-pilot having rudder control mechanism including an adjustable lost-motion follow-up connection.

A still further object is the provision of an automatic gyro-pilot having rudder control mechanism including a resilient follow-up connection.

The invention also aims to provide an automatic gyro-pilot for bombers including auxiliary rudder control mechanism operable by changes in the direction setting of the bombsight.

The invention further aims to provide an automatic gyro-pilot for bombers including auxiliary rudder control mechanism of the character described and provided with manually operable adjusting means.

Other objects and advantages of the invention will become apparent during the course of the following detailed description, taken in connection with the accompanying drawings, forming a part of this specification, and in which drawings, Figure 1 is a diagrammatic perspective view of a gyro-pilot provided with the auxiliary rudder control mechanism and showing the servo cable connections to the aircraft control surfaces.

Figure 2 is a view in side elevation of the rudder control unit.

Figure 3 is a top plan view of the rudder control unit, its top cover plate having been removed.

Figure 4 is a bottom plan view of he rudder control unit, its bottom cover plate having been removed.

2

Figure 5:
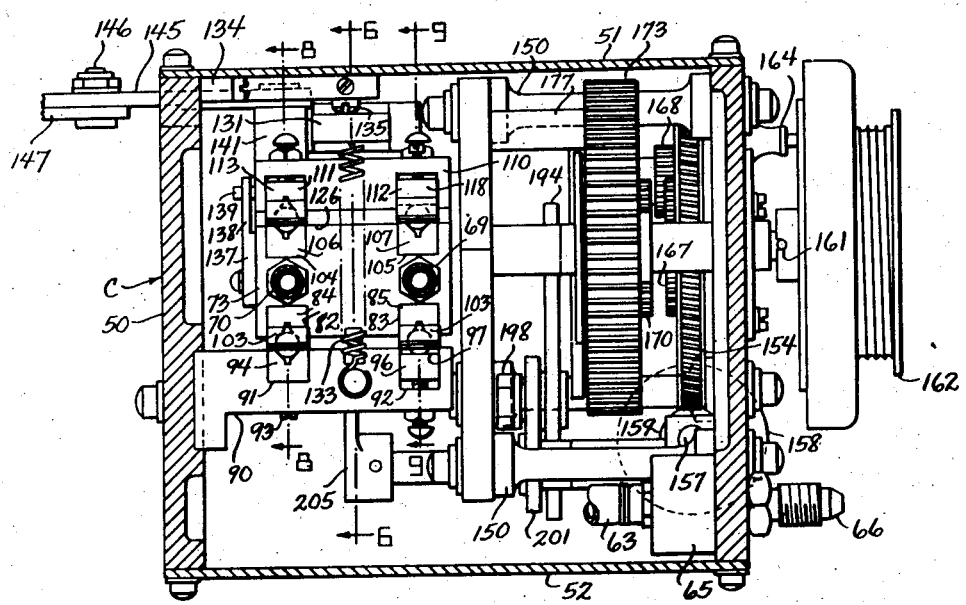
Figure 5 is a vertical transverse sectional view of the rudder control unit substantially on the line 5—5 of Figure 3.
Figure 6:
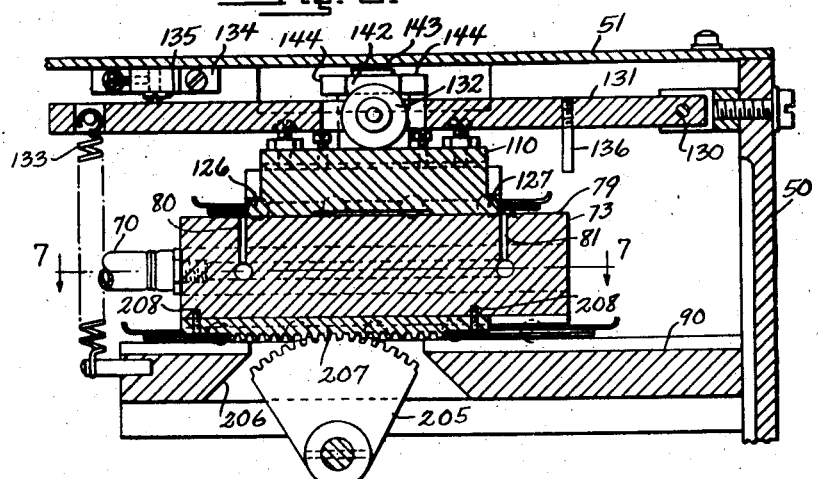

Figure 6 is a fragmentary vertical longitudinal sectional detail view substantially on the line 6—6 of Figure 5.

Figure 7:
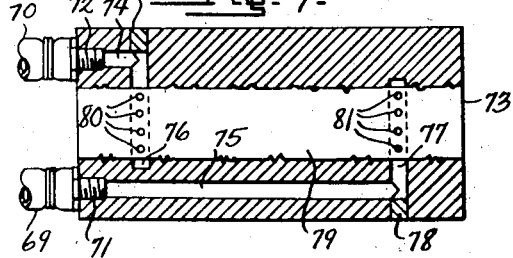

Figure 7 is a view partly in top plan and partly in horizontal section substantially on the line 7—7 of Figure 6 and showing details of a movable control member forming part of the invention.

Figures 8 and 9 are vertical longitudinal sectional detail views substantially on the lines 8—8 and 9—9, respectively, of Figure 5.

Figure 10 is a fragmentary horizontal sectional view substantially on the line 10—10 of Figure 2.

Figure 11 is a longitudinal vertical sectional view substantially on the line 11—11 of Figure 10 and showing motion transmitting means including a resilient lost-motion connection disposed in a centered position.

Figure 12 is a view similar to Figure 11 but showing the relationship of parts upon disposition of the lost-motion connection in an extreme position.

In the drawings, which for the purpose of illustration show only a preferred embodiment of the invention, and wherein similar reference characters designate corresponding parts throughout the several views, the letter A generally designates a conventional gyro-pilot provided with a bank and climb proportioning unit B and an auxiliary rudder control unit C.

In the example shown, the gyro-pilot A is of the general character shown and described in U. S. Patent No. 1,992,970, granted to Sperry, Jr., et al., and includes a rudder servo control unit 20 having a conventional oil valve 21 for controlling the flow of oil through pressure and exhaust conduits 21a, 21b to the rudder servomotor 22, and an aileron and elevator servo control unit 23 hydraulically connected, as by suitable conduits 24, 25 to the aileron servomotor 26 and elevator servomotor 27, respectively. The rudder, aileron and elevator servomotors 22, 26, 27 are connected, as by suitable cables 28, 29, 30 to the rudder, aileron and elevator surfaces 31, 32, 33, respectively. These servomotors may be provided with a common shaft 34 rotatable, as by a hand lever 35, to a position wherein the servomotors are by-passed for manual control.

Attached to the servo control units 20, 23 is a bank and climb proportioning unit B, such as shown and described in my copending U. S. patent application, Serial No. 442,728 filed May 12, 1942. This bank and climb proportioning unit B includes rudder, aileron and elevator follow-up pulleys 36, 37, 38, provided with follow-up connections 39, 40, 41, respectively, attached to the rudder, aileron and elevator servomotors 22, 26, 27. The unit B transmits motion from the rudder follow-up connection 39 to the aileron and elevator follow-up connections 40, 41 whereby to correlate the amount of bank and climb with the amount of rudder displacement of the aircraft.

The auxiliary rudder servo control unit C includes an oil valve 42 for controlling the flow of oil through pressure and exhaust conduits 42a, 42b, to the rudder servomotor 22. In order to selectively control the rudder servomotor 22, a valve 43 is interposed between the oil valves 21, 42 and the servomotor 22. This selector valve 43 is connected to the rudder servomotor 22 by a pair of conduits 44 and to the oil valves 21, 42 by pairs of conduits 45, 46. The valve 43 is provided with a reciprocable piston 47 urged, as by an expansible coil spring 48, into a position wherein the conduits 45 communicate with the conduits 44. Engaging the piston 47 is a rotary cam 49 turnable to shift the piston so as to bring the conduits 46 into communication with the conduits 44.

Referring now to the auxiliary rudder control unit C, the same includes a rectangular box-like housing 50 having top and bottom cover plates 51, 52. Extending through the rear wall 53 of the housing is a valve stem 56 connecting the oil valve 42 with a conventional air relay 57 including opposite outlet ports 59, 60. These ports communicate through cover plates 61, 62 with tubes 63, 64 connected, as by a manifold block 65, with a nipple 66 threaded for attachment to any suitable suction line (not shown). Connected to the air relay 57 at its air inlet nipples 67, 68 are tubes 69, 70 attached, as shown more particularly in Figure 7, to nipples 71, 72 threaded into one end of a rectangular block 73. Communicating with the nipples 71, 72 are longitudinal bores 74, 75, intersected by transverse bores 76, 77 having their outer ends sealed as by plugs 78. Extending downwardly from the plane upper surface 79 of the block are spaced transverse series of vertical bores 80, 81 communicating with the transverse bores 76, 77, respectively. Formed in the lower surface of the block 73 are parallel longitudinal grooves 82, 83, within which are securely pressed elongate hardened guide bars 84, 85 provided in their lower exposed faces with V-shaped grooves 86, 87.

Fixed to and extending along one side of the housing 50 is a horizontal interior shelf 90 provided in its upper face with parallel longitudinal grooves 91, 92. Rigidly fixed in the groove 91, as by screws 93, is a hardened elongate guide bar 94 provided in its upper exposed face with a V-shaped groove 95. Loosely fitting within the groove 92 is an elongate hardened bar 96 of rectangular shape in cross section and providing a plane upper surface 97. Threaded into the lower surface of the bar 96 are cap screws 98 whose shanks extend loosely through openings 99 in the shelf and whose heads 100 are of a size to prevent passage of the screws 98 through the openings 99. Threaded upwardly through the shelf 90 are set screws 101 engaging the inner face of the bar 96 to adjustably limit movement of the bar inwardly of the groove 92.

Disposed between the grooved bars 84, 95 and between the grooved and ungrooved bars 85, 96 are balls 102 held in spaced relation by suitable elongate retainers 103.

Formed in the upper surface of the block 73 are parallel longitudinal grooves 104, 105, within which are securely pressed elongate hardened guide bars 106, 107, provided in their upper exposed faces with V-shaped grooves 108, 109. Superimposed on the block 73 is a block 110 provided in its lower surface with parallel longitudinal grooves 111, 112. Loosely fitting within the groove 111 is an elongate hardened bar 113 provided in its lower exposed face with a V-shaped groove 114. Threaded into the upper surface of the bar 113 are cap screws 114 whose shanks extend loosely through openings 115 in the block 110 and whose heads 116 are of a size to prevent passage of the screws 114 through the openings 115. Threaded downwardly through the block 110 are set screws 117 engaging the inner face of the bar 113 to adjustably limit movement of the bar inwardly of the groove 111. Loosely fitting within the groove 112 is an elongate hardened bar 118 of rectangular shape in cross section and providing a plane lower surface 119. Threaded into the upper surface of the bar 118 are cap screws 120 whose shanks extend loosely through openings 121 in the block 110 and whose heads 122 are of a size to prevent passage of the screws 120 through the openings 121. Threaded downwardly through the block 110 is a set screw 123 engaging the inner face of the bar 118 to adjustably limit movement of the bar inwardly of the groove 112. Disposed between the grooved bars 106, 113 and the grooved and ungrooved bars 107, 118 are balls 124 held in spaced relation by suitable elongate retainers 125. Between the blocks 73 and 110 there may be provided a thin coat of oil and when the blocks 73 and 110 are adjusted by the set screws 117 and 123 a clearance is provided between the blocks 73 and 110, the thin coat of oil between the surfaces of the blocks serving as a pneumatic seal. As shown more particularly in Figure 6, the opposite ends of the block 110 are beveled to provide transverse knife edges 126, 127 which are so spaced as to cut the centers of the bores 80, 81 when the blocks 73, 110 are in a neutral relationship. Pivoted for swinging movement about a horizontal axis, as by a pin 130, is an arm 131 carrying a roller 132 urged into engagement with the upper surface of the block 110, as by a contractile coil spring 133 extending between the free end portion of the arm 131 and the shelf 90. Fixed above the free end portion of the arm 131 is a bracket 134 provided with a set screw 135 adjustably limiting upward swinging of the arm 131. Projecting downwardly from the arm 131 is a pin 136 limiting movement of the block 110. Fixed to one side of the block 73 is a plate 137 including spaced upright projections 138 cooperating with spaced pins 139 in the block 110 to limit relative movement of the blocks 73, 110.

Means is provided for moving the block 110 relative to the block 73. Fixed on the block 110, as by screws 140, is a rectangular perch 141 supporting a square button 142 that pivots about a vertical pin 143 in the perch. Straddling opposite sides of the button 142 are fingers 144 of a fork 145 releasably connected, as by a bolt 146, to an arm 147. This arm 147 forms part of an instrument such as a bombsight 148 and is arranged to swing in accordance with changes in the direction setting of the instrument.

Means is also provided for moving the block 73 relative to the block 110. Supported within the housing 50, as by spacer rods 150, is a frame member 151 provided with a bearing 152 supporting one end of a rudder control shaft 153. Rotatable on the shaft 153 is a worm wheel 154 including an axially projecting hub 155 supported in a bearing 156 carried by the housing 50. Supported by the housing 50 subjacent the worm wheel 154 is a shaft 157 manually rotatable, as by a knob 158, and provided with a worm 159 meshing with the worm wheel 154. Fastened on the shaft 153 exteriorly of the housing, as by a nut 160 and pin 161, is a rudder follow-up pulley 162 connected to the rudder servomotor 22, as shown in Figure 1, by a rudder follow-up cable 163. Connected between the follow-up pulley 162 and an anchor post 164 is a spiral spring 165 urging the follow-up pulley to rotate in a clockwise direction as viewed in Figure 2. Fixed on the shaft 153 as by a pin 166 is a spur gear 167 meshing with one gear 168 of a pair of intermeshing differential gears 168, 169, carried by the worm wheel, the other gear 169 meshing with a spur gear 170 fastened, as by a pin 171, to a toothed drum 172 rotatable on the shaft 153. Meshing with the toothed drum 172 is a similar toothed drum 173 rotatable on a shaft 174 and urged in a clockwise direction, as by a spiral spring 175 connected between the drum hub 176 and an anchor post 177. Returning now to the drum 172, rotatable on its hub 178 is a dog 179 having opposite fingers 180, 181. Extending between a pin 182 carried by the finger 180 and a pin 183 carried by the drum 172 is a spiral spring 184 resisting clockwise rotation of the dog 179 relative to the drum. Rotatable on the hub 178 is a dog 185 having a finger 186. Extending between a pin 187 carried by the finger 186 and the drum hub 178 is a spiral spring 188 resisting counterclockwise rotation of the dog 185 relative to the drum. Welded to the opposite fingers 180, 181 of the dog 179 is an annular concentric partition 189 separating the springs 184, 188. Disposed between the fingers 180, 186 is a pin 190 carried by the drum 172, and a pin 191 carried by a disc 192 rotatable on the shaft 153. Fixed to the hub 193 of the disc 192 is a crank arm 194 provided with a longitudinal slot 195 through which extends an adjustable crank pin 196. Encircling the pin 196 is a washer 197 brought into clamping engagement with the crank arm 194 as by a nut 198 and sleeve 199. Fixed to a rockshaft 200 is a crank arm 201 provided with a longitudinal slot 202 through which the crank pin sleeve 199 extends. Secured to the frame member 151 are pins 203, 204 limiting swinging movement of the crank arm 201 beyond predetermined spaced positions. Fixed on the rockshaft 200 is a sector gear 205 extending through a slot 206 in the shelf 90, as shown in Figure 6, and meshing with a rack 207 fixed to the base of the block 73, as by screws 208.

In the operation of the auxiliary rudder control mechanism C, opposite sides of the air relay 57 are subjected to equal suction through the nipple 66 and tubes 63, 64, and are equally vented through the tubes 69, 70, longitudinal bores 74, 75, tranverse bores 76, 77, and vertical bores 80, 81, when the blocks 73, 110 are disposed in centered or neutral relationship, as shown in Figure 6. Upon the occurrence of a change in the direction setting of the bombsight or other instrument 148, the arm 147 thereof will swing so that the fork 145 shifts the block 110 in a direction relative to the block 73 depending on the direction of change in the setting of the bombsight or other instrument 148. This movement of the block 110 relative to the block 73 will displace the knife edges 126, 127, so as to close one of the bores 80, 81 while opening the other. The resulting difference in pressure between opposite sides of the air relay 57 imparts movement to the oil valve 42 through the stem 56, whereby the rudder servo 22 is actuated in a direction depending on the direction of change in the setting of the bombsight or other instrument. From the rudder servo 22 movement is transmitted to the follow-up pulley 162 and shaft 153 via the follow-up connection 163. Rotation of the shaft 153 imparts opposite rotation to the toothed drum 172 via sector gear 167, differential gears 168, 169, and sector gear 170. Clockwise or counterclockwise rotation of the drum 172 is transmitted to the disc 192 via the spring 184 or spring 188, respectively, dog 179 or dog 185, respectively, and pin 191, to swing the crank arm 194 from the centered position shown in Figure 11. At first, the entire motion of the arm 194 is transmitted through the crank pin 196, to the arm 201, but in moving in either direction away from its centered position, an increasing amount of slippage occurs between the crank pin 196 and the arm at slot 202, whereby the ratio of motion transmission between the arms 194 and 201 decreases as the arm 194 swings away from its neutral position. Through the rockshaft 200, movement of the arm 201 is transmitted to the sector 205 so as to shift the block 73 relative to the block 110, the follow-up movement of the block 73 being in the same direction as the instrument-controlled movement of the block 110, whereby the bores 80, 81 are again brought into alignment with the knife edges 126, 127. Thus, the air relay 57 and oil valve 42 are recentered, and further movement of the rudder servomotor 22 away from neutral is prevented. It will, of course, be understood that as the aircraft turns toward the direction of travel in order to satisfy the instrument 148, the arm 147 thereof will commence retracting the block 110 to its original position, and the rudder servomotor is moved toward its neutral position.

Upon predetermined rotation of the rudder follow-up shaft 153, the crank arm 201 engages one of the stops 203, 204, as shown in Figure 12, whereby further movement of the disc 192 is prevented. Additional movement of the follow-up shaft will thereupon rotate the toothed drum 172 relative to the disc 192, against the resistance of the springs 184, 188, until limited by engagement of the dog 179 and one of the pins 190, 191. In Figure 12, the pin 190 carried by the toothed drum is shown in engagement with finger 181 of the dog 179, the opposite finger 180 of the dog abutting the pin 191 carried by the disc. The spring 175 exerts a counterclockwise bias on the toothed drum 172. It will thus be seen that a resilient lost-motion connection and a variable ratio motion transmission are provided between the follow-up shaft 153 and the rock shaft 200. By manipulating the control knob 158, the worm 159 and worm wheel 154 may be turned, for transmitting motion, through the differential gears 168, 169, and the sector gear 170, to the toothed drum 172. This arrangement permits adjustment of the block 107 relative to the block 110.

Various changes may be made in the form of invention herein shown and described without departing from the spirit of the invention or the scope of the following claims.

The invention described herein may be manufactured and/or used by or for the Government of the United States of America for governmental purposes without the payment of any royalties thereon or therefor.

What I claim is:

1. In an automatic pilot bomber for aircraft, a rudder operating means, an aileron operating means, a gyroscopic means for controlling said rudder operating means, a gyroscopic means for controlling said aileron operating means, a follow-up connection between said rudder operating means and said rudder controlling gyroscopic means, means responsive to operation of said rudder operating means for influencing said aileron controlling means whereby the amount of bank is correlated with the rudder displacement of the aircraft, an auxiliary mechanism for controlling said rudder operating means, a follow-up connection between said rudder operating means and said auxiliary mechanism, a bombsight, means connecting said auxiliary mechanism to said bombsight, said auxiliary mechanism, rudder operating means and gyroscopic rudder control means responsive to changes in the direction setting of said bombsight.

2. In an automatic pilot for aircraft, a rudder operating means, a rudder control mechanism including first and second members relatively movable for controlling the rudder operating means, a movable means for moving said first member relative to said second member, a rudder follow-up means connected to said second member, a resilient lost-motion connection between said second means and said follow-up means, said follow-up means so constructed and arranged to transmit motion from the rudder operating means to the second member at varying ratios depending on the position of the rudder operating means.

3. In an automatic pilot for aircraft, a rudder operating means, a rudder control mechanism including first and second members relatively movable for controlling the rudder operating means, movable means for moving the first member relative to the second member, a rudder follow-up means for moving the second member relative to the first member, a resilient lost-motion connection between said second member and said follow-up means, said follow-up means including driving and driven members, and means connecting the driving and driven members whereby movement of the driving member transmits motion in varying ratios to the driven member.

4. In an automatic aircraft pilot, a rudder operating means, an auxiliary mechanism connected to said rudder operating means including a rudder control mechanism having first and second members relatively movable for controlling the rudder operating means, movable means for moving the first member relative to the second member, a rudder follow-up means for moving the second member relative to the first, said follow-up means including a drive shaft provided with an arm, a driven shaft provided with an arm, a pin adjustably fixed to the drive shaft arm and slidably connected to the driven shaft arm, whereby movement of said drive shaft is transmitted in varying ratios to the driven shaft, and a resilient connection between said movable means and said follow-up means.

5. Auxiliary control mechanism for use with an aircraft gyro-pilot, said gyro-pilot comprising rudder operating means, and gyroscopic control means for the rudder operating means, said auxiliary control mechanism comprising first and second members movable for controlling the rudder operating means, instrument controlled means for moving the first member relative to the second member, rudder follow-up means connected to said second member and including a lost-motion connection and a resilient connection, said follow-up means having means for transmitting motion to said second member at varying ratios depending on the position of the rudder operating means.

6. Auxiliary control mechanism for use with an aircraft gyro-pilot, said gyro-pilot comprising rudder operating means and gyroscopic control means for the rudder operating means, said auxiliary control mechanism comprising first and second members movable for controlling the rudder operating means, instrument controlled means interconnected with said first member for moving the first member relative to the second member, rudder follow-up means including a lost-motion connection and mechanism for transmitting motion to said second member at varying ratios depending on the position of the rudder operating means, said follow-up means including a differential, and means operating through said differential for manually adjusting the first member relative to the second.

7. Auxiliary control mechanism for use with an aircraft gyro-pilot having a rudder operating means, said auxiliary control mechanism comprising first and second members relatively movable for controlling the rudder operating means, means for moving the first member relative to the second member, rudder follow-up means for moving the second member relative to the first member including interconnected driving and driven elements, said driven member responsive to movement of the driving member, a lost-motion connection between said driving and driven elements and a resilient connection between said driving and driven elements.

PLINY G. HOLT.

REFERENCES CITED

The following references are of record in the file of this patent:

UNITED STATES PATENTS

| Number | Name | Date |
|---|---|---|
| 1,880,671 | Bates | Oct. 4, 1932 |
| 1,896,805 | Sperry et al. | Feb. 7, 1933 |
| 1,919,191 | Bates | July 25, 1933 |
| 1,958,259 | Becker | May 8, 1934 |
| 1,992,970 | Sperry et al. | Mar. 5, 1935 |
| 2,091,306 | Carlson | Aug. 31, 1937 |
| 2,143,140 | Carlson | Jan. 10, 1939 |
| 2,191,250 | Fischel | Feb. 20, 1940 |
| 2,201,174 | Harding et al. | May 21, 1940 |
| 2,283,754 | Matthews | May 19, 1942 |
| 2,327,171 | Carlson | Aug. 17, 1943 |
| 2,346,857 | Meredith | Apr. 18, 1944 |

FOREIGN PATENTS

| Number | Country | Date |
|---|---|---|
| 260,260 | Great Britain | Jan. 12, 1928 |